(No Model.)
H. A. SPENCER.
HOISTING MECHANISM.
No. 496,799. Patented May 2, 1893.
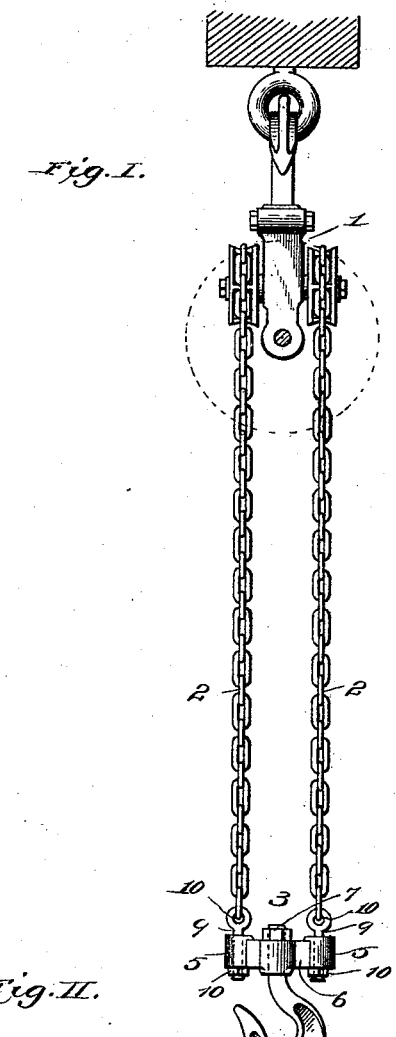
Fig. I.
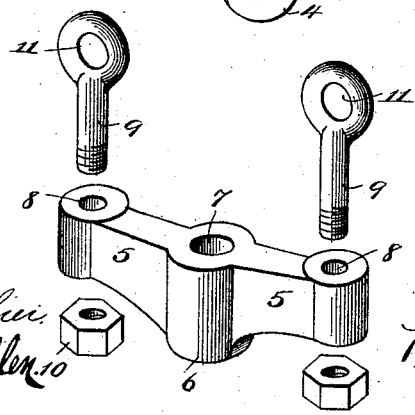
Fig. II.
Witnesses:
Harry S. Rohrer
Walter E. Allen
Inventor
Henry A. Spencer
By Knight Bros
Attorneys

UNITED STATES PATENT OFFICE.

HENRY A. SPENCER, OF STAMFORD, CONNECTICUT, ASSIGNOR TO THE YALE & TOWNE MANUFACTURING COMPANY, OF SAME PLACE.

HOISTING MECHANISM.

SPECIFICATION forming part of Letters Patent No. 496,799, dated May 2, 1893.

Application filed February 6, 1893. Serial No. 461,249. (No model.)

*To all whom it may concern:*

Be it known that I, HENRY A. SPENCER, a citizen of the United States, residing at Stamford, in the county of Fairfield and State of Connecticut, have invented certain new and useful Improvements in Hoisting Mechanism, of which the following is a specification.

My invention relates to the connection between the chains of a pulley block or other hoisting device, and the yoke which carries the depending load-bearing hook. Heretofore the pair of chains have been connected with the load-bearing hook at their lower ends, by having their end links passed through eyes, formed transversely in the ends of the cross bar or yoke which carries the hook. Serious objection has been found in practice to exist to this construction for the reason that when the hook and its projecting yoke, which together constitute the lower block, get turned over, as they frequently do in use, the chains are twisted. This twisting, though not easily detected when considerable length of chain has been paid out, not only prevents the links lying properly in the pockets of the chain wheel and thereby causing undue wear of the parts, but it likewise has a tendency to keep the links out of the pockets altogether, and thereby induces slipping and consequent danger to the load and operator. By my invention, all of the above-mentioned evils are overcome.

My invention consists in interposing between the ends of the two chains and the ends of the cross-bar or yoke, swivel-joints which permit the chains to turn freely, and automatically adjust their positions relatively to the cross-bar or yoke, when a load is on the hook and as the chain is wound up, so that each link will be permitted to assume proper position as it enters its pocket.

My invention is illustrated in the accompanying drawings, in which—

Figure I represents in elevation a hoisting device to which my invention is applied, and Fig. II represents in detached perspective, the parts of my improved swivel connections.

1 represents the upper block which is provided with the usual pocketed chain wheels and driving connections therefor.

2, 2, represent the parts or ends of the doubled chain which pass over the respective pocketed chain-wheels and thence downward to make connection with the lower load bearing block 3. This load-bearing block 3, consists of the usual hook 4, and lateral projections or ears 5. These ears may be formed as customarily, by a cross-bar or yoke, 6, in which the hook 4 is centrally swiveled as at 7.

In making my improved swivel attachment, the projections 5 are perforated at 8 and through these perforations eye-bars 9 are inserted and secured by nuts 10. In the eyes 11, the ends of the chain are connected, and the connection thus becomes complete.

From the foregoing it will be seen that the connection between the chains and the cross-bar or yoke which forms the lateral projections, permits free relative movement between said parts, so that the chain can at all times readily adjust itself to the pockets of the wheel.

What I claim is—

1. In a hoisting device, the combination of the upper and lower blocks, and the chains connected with said blocks; the connection between the chains and the lower block being through the medium of the swivel joints which permit rotary adjustment of the said chains relatively to the said block, as and for the purpose explained.

2. In a hoisting device, the combination of the upper block having the pocketed chain wheels, the chains passing around said wheels, and fitted to the pockets therein, the lower load-bearing block and the independent swivel connections between the ends of said chains and the load-bearing block, consisting of the bars passed through perforations in the block and secured therein, substantially as and for the purpose set forth.

HENRY A. SPENCER.

Witnesses:
SCHUYLER MERRITT,
GEO. E. WHITE.